United States Patent
Shmaya

(10) Patent No.: US 12,038,853 B2
(45) Date of Patent: Jul. 16, 2024

(54) REDUCING LINK UP TIME IN PCIe SYSTEMS

(71) Applicant: Western Digital Technologies, Inc., San Jose, CA (US)

(72) Inventor: Shuli Shmaya, Ks (IL)

(73) Assignee: Western Digital Technologies, Inc., San Jose, CA (US)

( * ) Notice: Subject to any disclaimer, the term of this patent is extended or adjusted under 35 U.S.C. 154(b) by 217 days.

(21) Appl. No.: 17/726,762

(22) Filed: Apr. 22, 2022

(65) Prior Publication Data

US 2023/0342308 A1    Oct. 26, 2023

(51) Int. Cl.
*G06F 13/10*    (2006.01)
(52) U.S. Cl.
CPC .................................. *G06F 13/102* (2013.01)
(58) Field of Classification Search
None
See application file for complete search history.

(56) References Cited

U.S. PATENT DOCUMENTS

| | | |
|---|---|---|
| 8,793,541 B2 | 7/2014 | Hsu et al. |
| 2013/0067127 A1 | 3/2013 | Hopgood et al. |
| 2019/0196991 A1 | 6/2019 | Das Sharma |
| 2020/0159449 A1* | 5/2020 | Davis .................... G06F 3/0604 |
| 2021/0117350 A1 | 4/2021 | Safranek et al. |
| 2021/0367900 A1 | 11/2021 | Das Sharma |

\* cited by examiner

*Primary Examiner* — Scott C Sun
(74) *Attorney, Agent, or Firm* — PATTERSON + SHERIDAN, LLP

(57) ABSTRACT

The present disclosure generally relates to reducing link-up time between an upstream device and a downstream device. Rather than re-coordinating the link between devices each time, knowledge gained from a previous link-up is used to speed up the link-up. Typically, when both the upstream device and the downstream device have not changed, then the coefficient values for downstream port (DSP) transmission (Tx) equilibrium (EQ) that resulted in a desired bit error rate (BER) should not have changed either. Hence, rather than exchanging coefficients, the previous values can be reused with confidence eliminating the need to exchange coefficients. In so doing, the link-up process is much faster and system resources are not wasted on unnecessary coefficient exchanges.

10 Claims, 8 Drawing Sheets

| | | | |
|---|---|---|---|
| 31 23 | 15 | 7 | 0 |
| DEVICE ID | | VENDOR ID | 00h |
| STATUS | | COMMAND | 04h |
| CLASS CODE | | REV ID | 08h |
| BIST | HEADER TYPE | LATENCY TIMER | CACHE LINE SIZE | 0Ch |
| BASE ADDRESS 0 (BAR0) | | | 10h |
| BASE ADDRESS 1 (BAR1) | | | 14h |
| BASE ADDRESS 2 (BAR2) | | | 18h |
| BASE ADDRESS 3 (BAR3) | | | 1Ch |
| BASE ADDRESS 4 (BAR4) | | | 20h |
| BASE ADDRESS 5 (BAR5) | | | 24h |
| CARD BUS CIS POINTER | | | 28h |
| SUBSYSTEM DEVICE ID | | SUBSYSTEM VENDOR ID | 2Ch |
| EXPANSION ROM BASE ADDRESS | | | 30h |
| RESERVED | | CAPABILITY POINTER | 34h |
| RESERVED | | | 38h |
| MAX LAT | MIN GNT | INTERRUPT PIN | INTERRUPT LINE | 3Ch |

*Fig. 7*

REDUCING LINK UP TIME IN PCIe SYSTEMS

BACKGROUND OF THE DISCLOSURE

Field of the Disclosure

Embodiments of the present disclosure generally relate to reducing the link-up time between an upstream device and a downstream device in a peripheral component interconnect (PCI) express (PCIe) system.

Description of the Related Art

In a PCIe system, there is a link training and status state machine (LTSSM) state called Recovery. The Recovery state can be entered due to a speed change, a link width change, errors in the L0 power state, recovery from L1 back to L0, or recovery from L0 if the link doesn't train properly using fast training sequence (FTS).

The Recovery state includes a sub-state called Recovery. Equalization which establishes the proper equalization parameters to obtain good signal integrity. To obtain the proper parameters, an upstream device such as a data storage device controller, requests a speed change from a downstream device such as a memory device. The upstream and downstream devices verify reliable lane operation using bit error rate (BER). Specifically, the BER will be less than a predetermined threshold for reliability lane operation. Coefficient values are exchanged in various phases to adjust downstream port (DSP) transmission (Tx) equilibrium (EQ) until achieving a desired BER. Once the BER achieves the desired BER, then the coefficient values are set for the requested speed.

Exchanging coefficient values to obtain a desired BER can be time consuming and wastes system resources. Therefore, there is a need in the art for reducing link-up time.

SUMMARY OF THE DISCLOSURE

The present disclosure generally relates to reducing link-up time between an upstream device and a downstream device. Rather than re-coordinating the link between devices each time, knowledge gained from a previous link-up is used to speed up the link-up. Typically, when both the upstream device and the downstream device have not changed, then the coefficient values for downstream port (DSP) transmission (Tx) equilibrium (EQ) that resulted in a desired bit error rate (BER) should not have changed either. Hence, rather than exchanging coefficients, the previous values can be reused with confidence eliminating the need to exchange coefficients. In so doing, the link-up process is much faster and system resources are not wasted on unnecessary coefficient exchanges.

In one embodiment, a data storage device comprises: a memory device; and a controller coupled to the memory device, wherein the controller is configured to: send a speed change request to a host device; determine that optimal channel setup values exist for link-up between the host device and the data storage device, wherein the optimal channel setup values are calculated prior to sending the speed change request, and wherein the optimal channel setup values correspond to channel setup values associated with the requested speed change; and perform channel setup using the optimal channel setup values.

In another embodiment, a data storage device comprises: a memory device; and a controller coupled to the memory device, wherein the controller is configured to: send a speed change request to a host device; determine that optimal channel setup values do not exist for link-up between the host device and the data storage device; perform channel setup and determine the optimal channel setup values; record the optimal channel setup values in a table; send a speed change request to the host device; and perform channel setup using the recorded optimal channel setup values.

In another embodiment, a data storage device comprises: memory means; and a controller coupled to the memory means, wherein the controller is configured to: determine whether optimum channel setup values exist for a particular channel in response to a speed change request; and implement the optimum channel setup values, wherein the implementing occurs without searching for the optimum channel setup values.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 7 is a schematic illustration of the configuration information for a downstream device according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to reducing link-up time between an upstream device and a downstream device. Rather than re-coordinating the link between devices each time, knowledge gained from a previous link-up is used to speed up the link-up. Typically, when both the upstream device and the downstream device have not changed, then the coefficient values for downstream port (DSP) transmission (Tx) equilibrium (EQ) that resulted in a desired bit error rate (BER) should not have changed either. Hence, rather than exchanging coefficients, the previous values can be reused with confidence eliminating the need to exchange coefficients. In so doing, the link-up process is much faster and system resources are not wasted on unnecessary coefficient exchanges.

Figure 1:
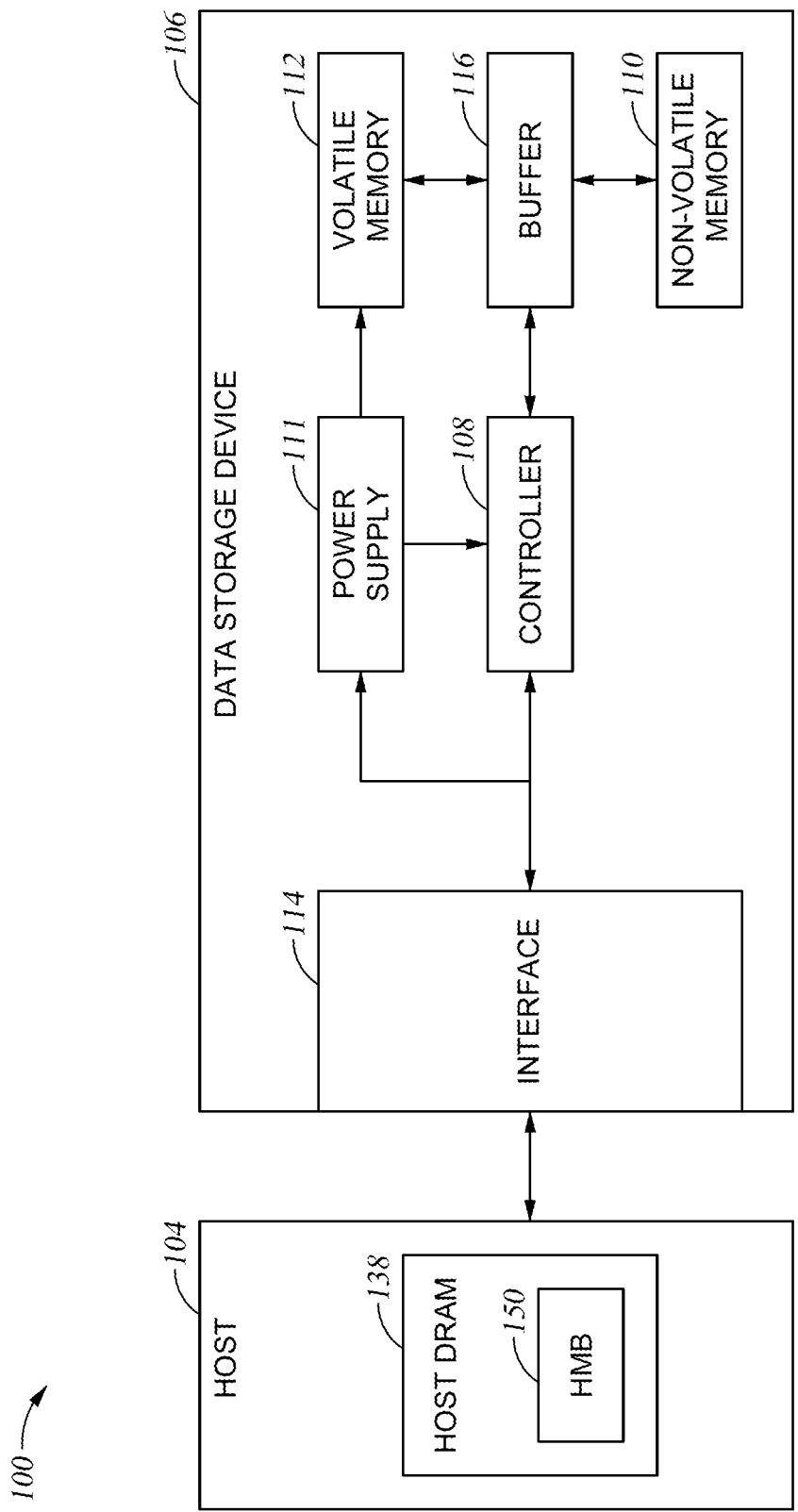
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. The host DRAM 138 includes a host memory buffer (HMB) 150. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Furthermore, the controller 108 may store data and retrieve data from the HMB 150. The HMB 150 is a portion of the host DRAM 138 that is apportioned for use by the controller 108 without host device 104 interaction. For example, the HMB 150 may be used to store data normally stored in an internal RAM, such as SRAM or DRAM. In other examples, the controller 108 may store data in the HMB 150 during a shutdown operation such that the data may not be lost due to flushing of the volatile memory 112. Furthermore, latency of accessing and retrieving data from the HMB 150 may be quicker than accessing and retrieving data of the NVM 110, such that the controller 108 may program data to the HMB 150 during the operation of the data storage device 106 and commit the data that is programmed to the HMB 150 to the NVM 110 at certain points during the operation of the data storage device 106.

In NVMe protocol, the HMB 150 may be accessed by the controller 108 when the data storage device 106 is in a low power mode. For example, if the controller 108 indicates support for the HMB Prohibit Non-Operational Access (NAP) in the Controller Attributes (CTRATT) field in the Identify Controller data structure and the NAP bit is set to '1' (disabled), then the controller 108 may access the HMB 150 while processing a command submitted to the Admin Submission Queue. However, when the Non-Operational Access Prohibit is enabled, the controller 108 may not access the HMB 150 in order to perform controller-initiated activity, such as an activity not directly associated with a host command. It is to be understood that the previously listed example is not intended to be limiting, but to provide an example of a possible embodiment.

Figure 2:
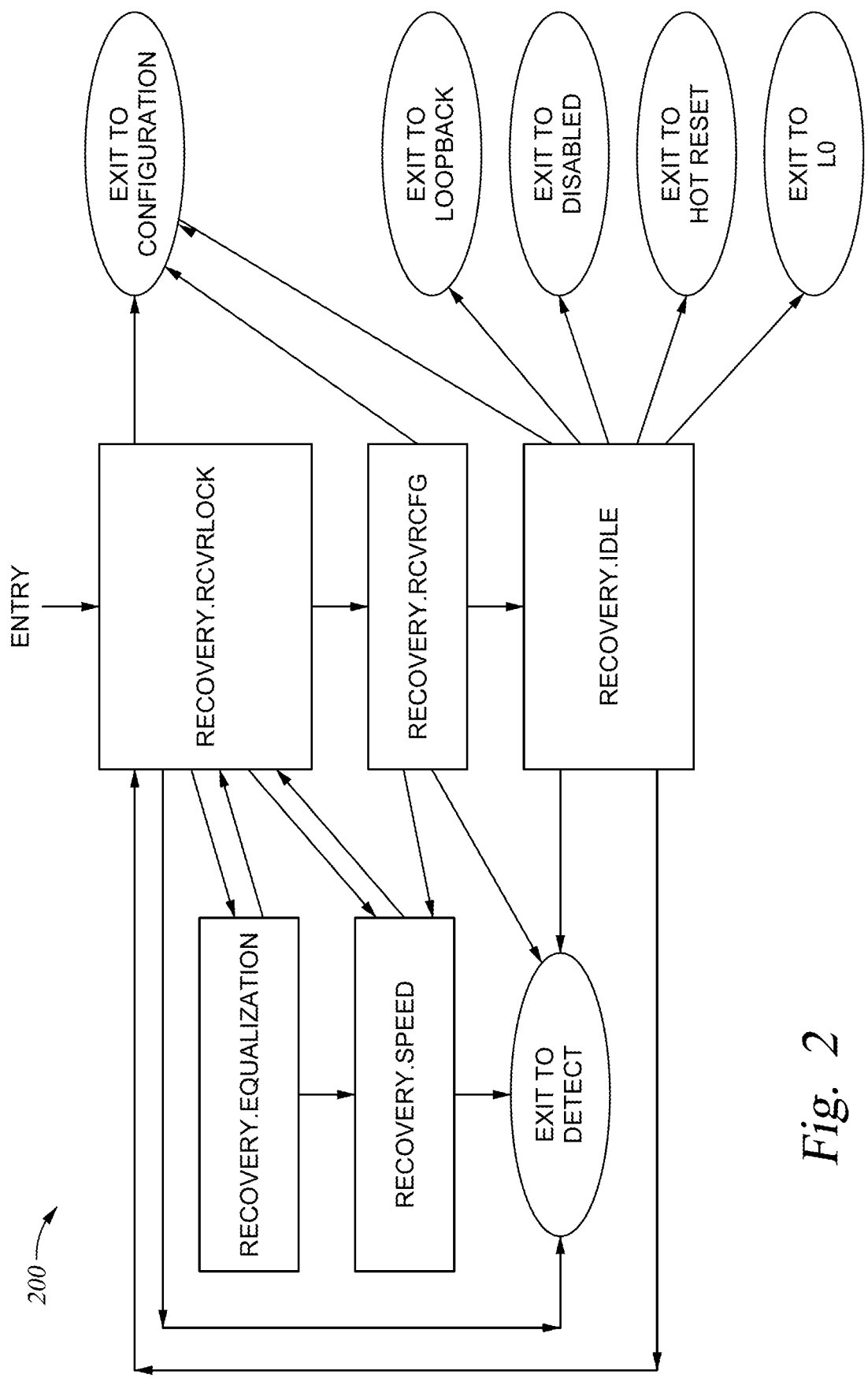
FIG. 2 is a schematic illustration of the Recovery state machine.
Figure 3:
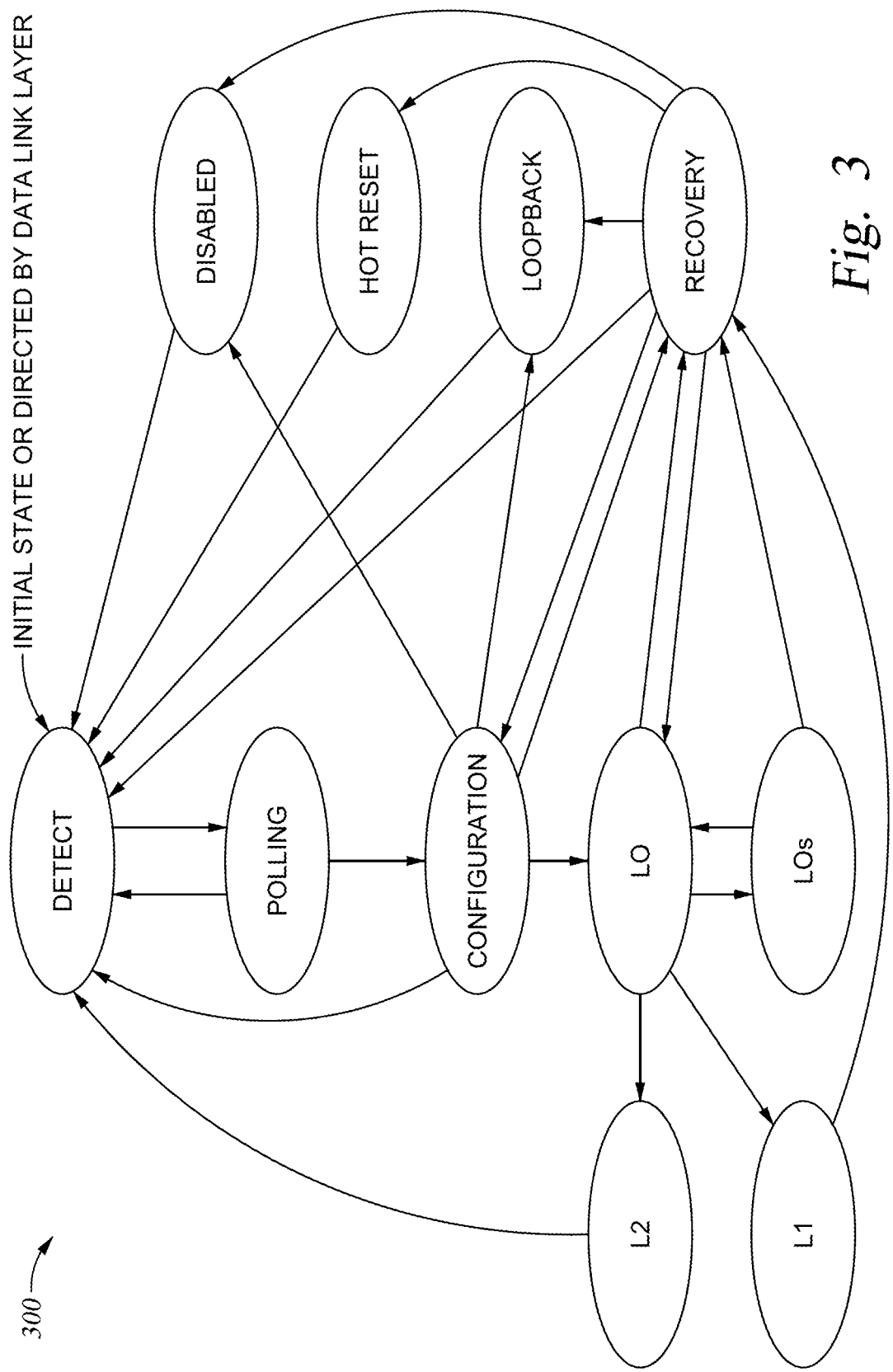
FIG. 3 is a schematic illustration of the LTSSM state machine.
Figure 4:
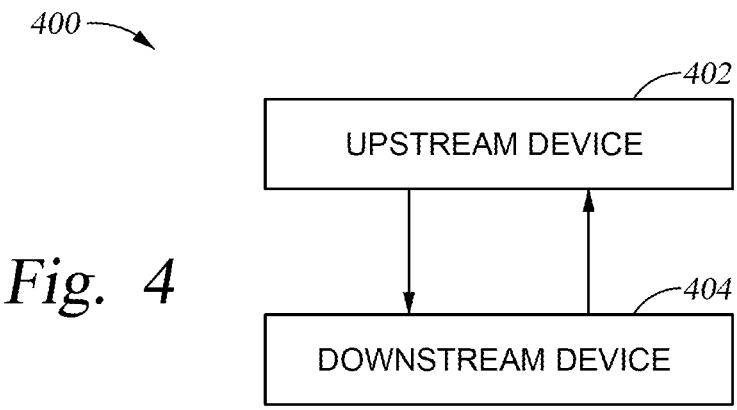
FIG. 4 is a schematic illustration of a connection between an upstream device and a downstream device.
Figure 5:
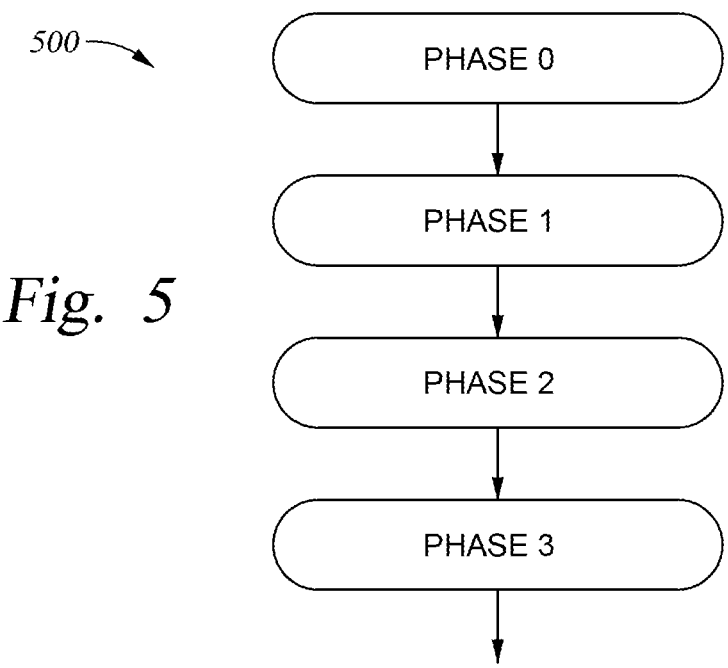
FIG. 5 is schematic illustration of the phases for instituting a speed change between an upstream device and a downstream device.

FIG. 2 is a schematic illustration of the Recovery state machine 200, and FIG. 3 is a schematic illustration of the LTSSM state machine 300. FIG. 4 is a schematic illustration of a connection 400 between an upstream device and a downstream device, and FIG. 5 is schematic illustration of the phases 500 for instituting a speed change between an upstream device and a downstream device.

Consider a system that is powered up and requests a speed change from 2.5 GT/s to 8 GT/s. When powering up a PCIe system, the upstream device 402 and downstream device 404, which are partners, start to negotiate at the lowest rate of 2.5 GT/s in this example. The LTSSM state machine 300 starts at the Detect state and moves to the Polling State, Configuration State, and then L0. If the partners (i.e., the upstream device 402 and the downstream device 404) agree to change speed, both the upstream device 402 and the downstream device 404 enter the Recovery state.

Before starting the speed change process, the upstream device 402 instructs the downstream device 404 on the initial preset value to be used. It is agreed that the suggested coefficient value is not optimal for the specific channel and is used only as a starting point for further negotiations. Furthermore, it is expected that the BER with those coefficients can be less than $10^{-12}$ and no worse than $10^{-4}$. The BER test of the downstream device 404 is called Phase 0.

Figure 6:
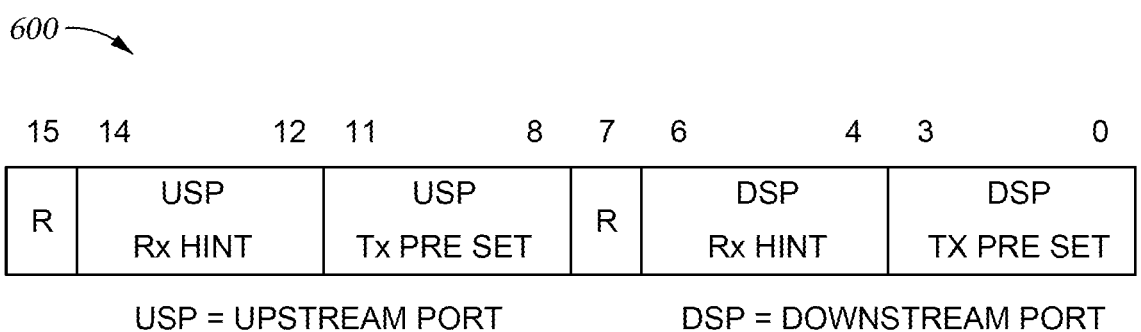
FIG. 6 is a schematic illustration of a TS1/TS2 order set according to one embodiment.

FIG. 6 is a schematic illustration of a TS1/TS2 order set 600 according to one embodiment. The preset coefficient values located on the equalization control register, USP Tx Preset as shown in FIG. 6, are sent to the downstream device 404 via the TS1/TS2 order set 600. If Phase 0 is successful, then Phase 1 is entered where the upstream device 402 verifies reliable lane operation (i.e., BER no worse than $10^{-4}$). Following Phase 1, Phase 2 is entered during which the downstream device 404 sends coefficient values to adjust the upstream Tx Eq. The downstream device 404 continues to send coefficient values until a BER of better than $10^{-12}$ is obtained. Once the sufficient BER is obtained, Phase 3 is entered. During Phase 3, the upstream device 402 sends coefficient values to adjust the downstream Tx Eq until a BER of better than $10^{-12}$ is obtained. The process of obtaining the best coefficient value can take up to 24 ms for each port.

As will be discussed herein, the link-up time needs to be reduced. Phases 2 and 3 are the best candidates for reducing link-up time. The first time that a card is inserted into a system (e.g., data storage device links with a host over a PCIe bus), the same process discussed above occurs. However, the coefficient values obtained for the specific channels can be stored in a table at the upstream device. In one embodiment, the data storage device 106 can be the upstream device 402 and the host 104 can be the downstream device 404. It is contemplated that the host 104 can be the upstream device 402 and the data storage device 106 may be the downstream device 404.

When a second link is attempted between the upstream device 402 and the downstream device 404, knowledge gained from the original link-up can be used to speed up the link-up process. Whenever the system enters the Recover. Equalization state for any reason, the upstream device 402 will have the ability to suggest the best coefficient value to use and hence avoid the need to waste time in Phases 2 and 3. The knowledge gained in the original link-up can be stored in a table that contains information such as vendor ID, Device ID, Subsystem Vendor ID, Subsystem ID, Lane number, Rate, and Upstream Transmission Preset for example. A sample table is shown below:

TABLE

| Vendor ID | Device ID | Subsystem Vendor ID | Subsystem ID | Lane # | Rate | USP Tx Preset |
|---|---|---|---|---|---|---|
| 1 | 6 | 10 | A | 1 | 5 | X |
| 2 | 7 | 10 | B | 2 | 6 | X |
| 3 | 6 | 10 | A | 1 | 7 | X |
| 4 | 8 | 10 | A | 1 | 6 | X |
| 5 | 7 | 10 | A | 1 | 5 | X |

Prior to entering the Recovery state, the root complex/upstream device 402 already knows the configuration space as well as the Vendor ID, Device ID, Subsystem Vendor ID, and Subsystem ID of the other device. FIG. 7 is a schematic illustration 700 of the configuration information for a downstream device according to one embodiment that the upstream device will already know for subsequent link-ups. Using the table, the upstream device 402 can choose the relevant preset value to be used for the specific downstream device that will yield the best BER and hence, reduce time by eliminating the need for analyzing coefficients to improve BER in Phases 2 and 3. In other words, Phases 2 and 3 can be skipped due to the knowledge gained and stored from the original link-up between the upstream device 402 and the downstream device 404. The table can be preloaded on the upstream device or modified on the fly (i.e., dynamically) to provide the most updated presets for each rate per downstream device.

Figure 8:
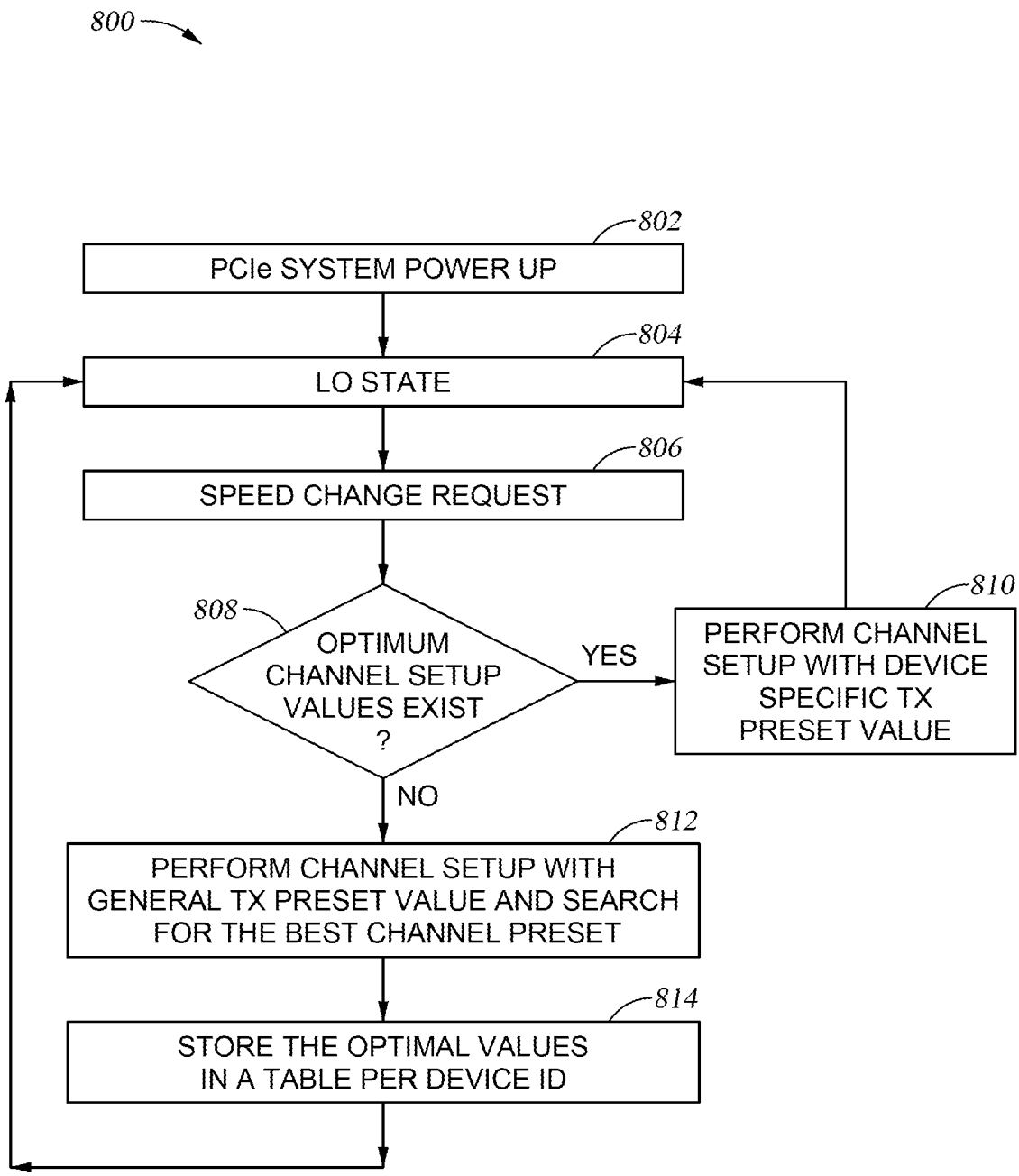
FIG. 8 is a flowchart illustrating link-up between an upstream device and a downstream device according to one embodiment.

FIG. 8 is a flowchart 800 illustrating link-up between an upstream device and a downstream device according to one embodiment. The PCIe system powers up at 802 and enters the L0 state at 804. The upstream device 402 sends a speed request to the downstream device 404 at 806. A determination is made at 808 regarding whether optimum channel setup values exist. The optimum channel setup values would exist if the upstream device 402 and the downstream device 404 have linked-up previously. If there are optimum channel setup values, then channel setup is performed using the specific transmission present values at 810 followed by a return to the L0 state at 804. If there are not optimum channel setup values, then the channel setup with general transmission preset values are used to begin the search for the best channel preset at 812. Once the best channel preset is determined, the optimum values are stored in a table per device ID at 814 followed by a return to the L0 state at 804.

Figure 9:
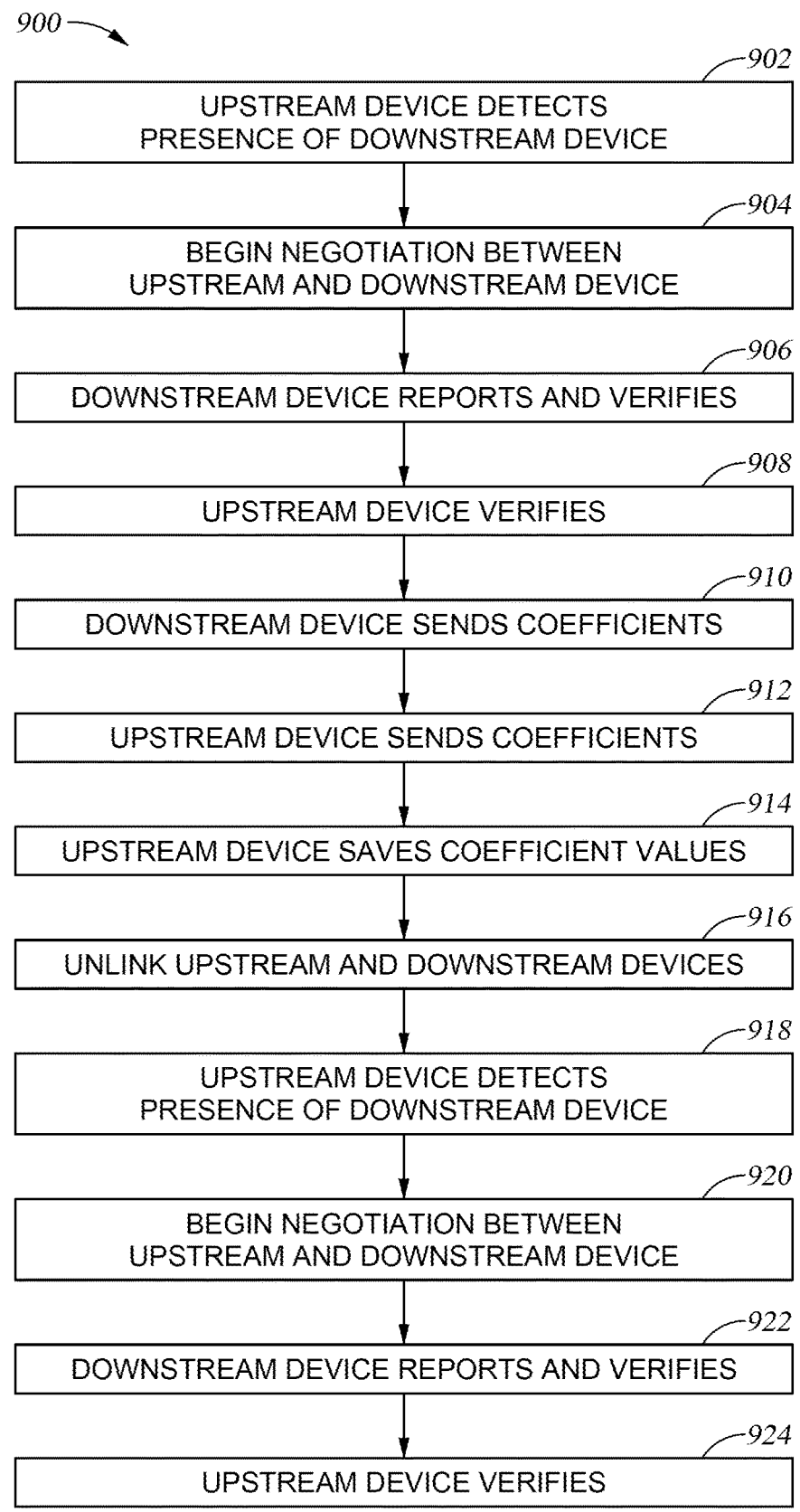
FIG. 9 is a flowchart illustrating link-up between an upstream device and a downstream device according to one embodiment.

FIG. 9 is a flowchart 900 illustrating link-up between an upstream device 402 and a downstream device 404 according to one embodiment. It is contemplated that FIG. 9 is applicable to the situation where the upstream device 402 is the host device 104 and the downstream device 404 is the data storage device 106. It is also contemplated that the data storage device 106 may be the upstream device 402 while the host device 104 may be the downstream device 404. At 902, the downstream device 404 is connected to the upstream device 402 for the first time, and the upstream device 402 detects the presence of the downstream device 404. The connection may occur, for example, by inserting the data storage device 106 into a slot of a host device 104.

Now that the upstream device 402 knows that the downstream device 404 is present, the upstream device 402 and the downstream device 404 will begin the negotiation at the lowest transmission rate (e.g., 2.5 GT/s) at 904 and Phase 0 begins. The downstream device 404 reports the presets that the downstream device 404 was given and verifies reliable lane operation (i.e., a BER of less than a threshold value such as $10^{-4}$) at 906.

Phase 1 then begins and the upstream device 402 verifies reliable lane operations (i.e., BER of less than the threshold value) at 908 and indicates a move to Phase 2. At Phase 2, the downstream device 404 sends coefficient values to adjust the DSP Tx Eq until the BER is less than a second threshold value (e.g., $10^{-12}$) at 910. When the BER is less than the second threshold value, the downstream device 404 indicates a move to Phase 3. At Phase 3, the upstream device 402 sends coefficient values to adjust the upstream port (USP) Tx Eq until the BER is less than the second threshold value at 912, at which point the upstream device indicates completion and a move to Phase 0. The upstream device saves the relevant coefficient values at 914.

At a later point in time, assume the upstream device 402 and downstream device 404 have been unlinked at 916. At 918, the upstream device 402 detects the presence of the downstream device 404. The upstream device 402 and downstream device 404 can begin the negotiation at 920. Because the upstream device 402 and downstream device 404 have previously been linked, the upstream device 402 consults the relevant location where the relevant coefficient values were stored and retrieves the values. An example of when the upstream device 402 and downstream device 404 have previously been linked is a laptop having a data storage device embedded therein. The upstream device 402 transmits the coefficient values to the downstream device 404 and Phase 0 begins. The downstream device 404 reports the presets and verifies reliable lane operation for the second threshold at 922 and Phase 1 begins. The upstream device 402 verifies reliable lane operation for the second threshold at 924 and finishes the link-up procedure by indicating a move to Phase 0 which thus skips both Phase 1 and Phase 2 due to the knowledge gained on the original link-up.

Figure 10:
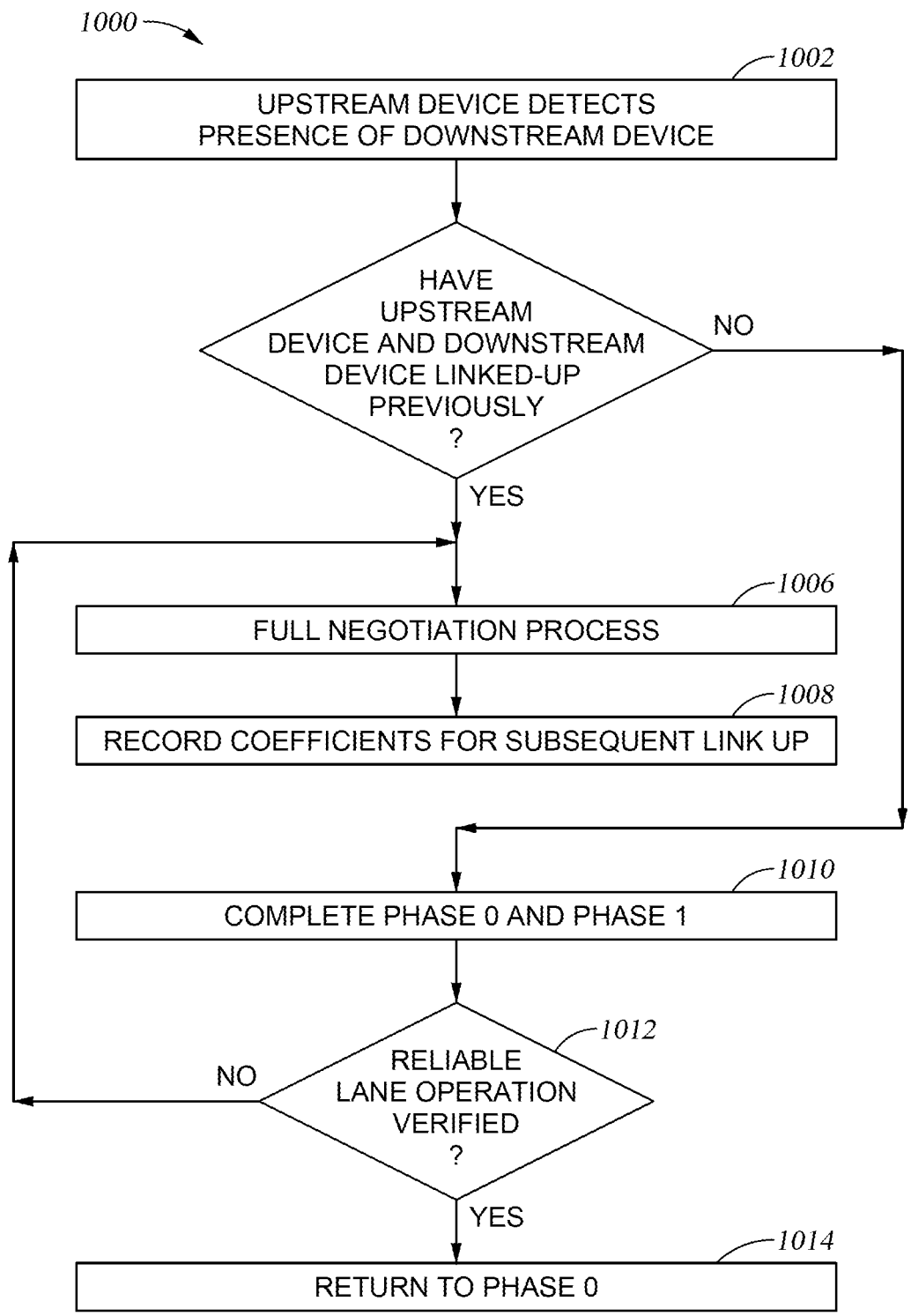
FIG. 10 is a flowchart illustrating link-up between an upstream device and a downstream device according to one embodiment.

FIG. 10 is a flowchart 1000 illustrating link-up between an upstream device 402 and a downstream device 404 according to one embodiment. Initially, the upstream device 402 detects the presence of the downstream device 404 at 1002. A determination is then made regarding whether the upstream device 402 and the downstream device 404 have previously linked at 1004. If the upstream device 402 and downstream device 404 have not previously linked, then the full negotiation process occurs at 1006 whereby Phases 0-3 occur and the resulting coefficients are saved for future link-ups at 1008.

If the upstream device 402 and the downstream device 404 have previously linked, then Phase 0 and Phase 1 are completed using saved coefficient values at 1010. A determination is made at 1012 regarding whether the saved coefficients were sufficient. It is contemplated that the saved values should be sufficient, but it is possible that the coefficients will need to change over time and hence, not be verifiable at some point in time. If the coefficient values are verified at 1012, then there is a return to Phase 0 and the link-up process is complete. If the coefficient values are not verified, then the full negotiation occurs at 1006 and the new, updated coefficient values are recorded at 1008. If the coefficient values never need to change, then the table where the coefficient values are stored is static and can even be preloaded into the upstream device. However, if the coefficient values will change over time, then the table needs to be dynamic and hence be updated whenever the verification of Phases 0 and 1 fails.

By reusing previous coefficients for DSP Tx EQ rather than exchanging coefficients, upstream and downstream devices can link-up much faster and not waste system resources on unnecessary exchanges. Phases 2 and 3 can be skipped, which saves the time and increases the link-up speed. Eliminating Phases 2 and 3 can save as much as 24 ms per phase or 48 ms total. Furthermore, the previous coefficients can be stored in a table in the upstream device.

In one embodiment, a data storage device comprises: a memory device; and a controller coupled to the memory device, wherein the controller is configured to: send a speed change request to a host device; determine that optimal channel setup values exist for link-up between the host device and the data storage device, wherein the optimal channel setup values are calculated prior to sending the speed change request, and wherein the optimal channel setup values correspond to channel setup values associated with the requested speed change; and perform channel setup using the optimal channel setup values. The controller is further configured to send the optimal channel setup values to the host device. The optimal channel setup values correspond to a bit error rate of $10^{-12}$ or better. The controller is further configured to store the optimal channel setup values in a table. The table is preloaded into the controller. The table is dynamic. The controller is configured to send the speed change request when the data storage device is in a L0 state. The optimal channel setup values correspond to speeds of 8 GT/s or greater. The controller is configured to receive presets values from the host device. The controller is further configured to verify reliable channel operation of a BER that is less than $10^{-4}$.

In another embodiment, a data storage device comprises: a memory device; and a controller coupled to the memory device, wherein the controller is configured to: send a speed change request to a host device; determine that optimal channel setup values do not exist for link-up between the host device and the data storage device; perform channel setup and determine the optimal channel setup values; record the optimal channel setup values in a table; send a speed change request to the host device; and perform channel setup using the recorded optimal channel setup values. The link-up is over a PCIe bus. Performing channel setup comprises proceeding through Phase 0, Phase 1, Phase 2, and Phase 3 to verify BER suitability. In Phase 0, the host device reports presets for a particular speed and verifies the BER. In Phase 1 the controller verifies BER and indicates moving to Phase 2. In Phase 2 the host device sends coefficient values to adjust DSP Tx Eq until achieving a predetermined BER. In Phase 3, the controller sends coefficient values to USP Tx Eq until the achieving the predetermined BER. Performing channel setup using the recorded optimal channel setup values comprises skipping Phase 2 and Phase 3. The verified BER in Phase 0 and Phase 1 is less than $10^{-4}$. The predetermined BER in Phase 2 and Phase 3 is less than $10^{-12}$.

In another embodiment, a data storage device comprises: memory means; and a controller coupled to the memory means, wherein the controller is configured to: determine whether optimum channel setup values exist for a particular channel in response to a speed change request; and implement the optimum channel setup values, wherein the implementing occurs without searching for the optimum channel setup values. The controller is configured to send the optimum channel setup values to a downstream device. The determining and implementing occurs during a recovery state.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   send a speed change request to a host device;
   determine that optimal channel setup values exist for link-up between the host device and the data storage device, wherein the optimal channel setup values are calculated prior to sending the speed change request, and wherein the optimal channel setup values correspond to channel setup values associated with the requested speed change; and
   perform channel setup using the optimal channel setup values.

2. The data storage device of claim 1, wherein the controller is further configured to send the optimal channel setup values to the host device.

3. The data storage device of claim 1, wherein the optimal channel setup values correspond to a bit error rate of $10^{-12}$ or better.

4. The data storage device of claim 1, wherein the controller is further configured to store the optimal channel setup values in a table.

5. The data storage device of claim 4, wherein the table is preloaded into the controller.

6. The data storage device of claim 4, wherein the table is dynamic.

7. The data storage device of claim 1, wherein the controller is configured to send the speed change request when the data storage device is in a L0 state.

8. The data storage device of claim 1, wherein the optimal channel setup values correspond to speeds of 8 GT/s or greater.

9. The data storage device of claim 1, wherein the controller is configured to receive presets values from the host device.

10. The data storage device of claim 1, wherein the controller is further configured to verify reliable channel operation of a BER that is less than $10^{-4}$.

\* \* \* \* \*